Figure 1:
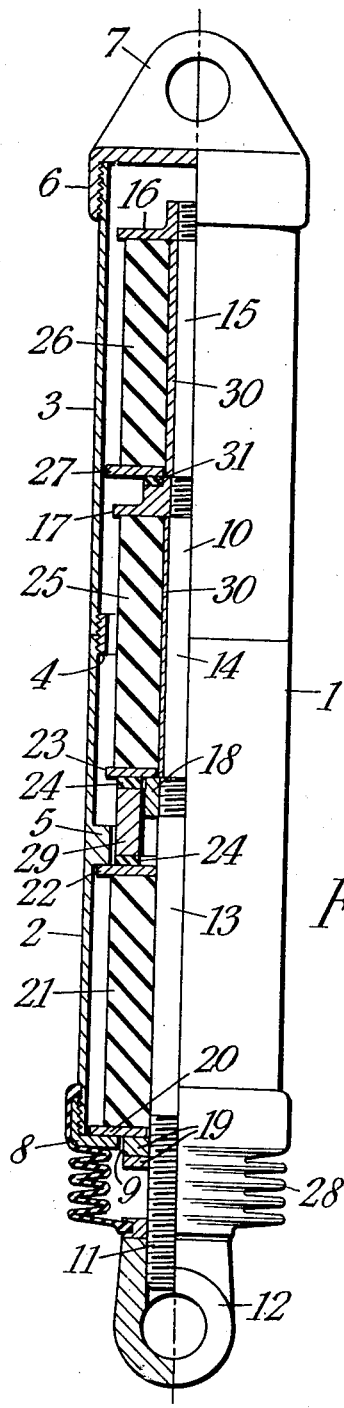

Feb. 23, 1954          R. M. SEDDON           2,670,200
              RESILIENT SUSPENSION SPRINGS
Filed April 1, 1952                        2 Sheets-Sheet 1

INVENTOR
Robert Maxwell Seddon
by Benj. T. Rauber
his attorney

Feb. 23, 1954 R. M. SEDDON 2,670,200
RESILIENT SUSPENSION SPRINGS
Filed April 1, 1952 2 Sheets-Sheet 2

INVENTOR
Robert Maxwell Seddon
by Benj. T. Rauber
his attorney

Patented Feb. 23, 1954

2,670,200

UNITED STATES PATENT OFFICE 2,670,200

RESILIENT SUSPENSION SPRINGS

Robert Maxwell Seddon, Walmley, Sutton Coldfield, England, assignor to Dunlop Rubber Company Limited, London County, England, a British company Application April 1, 1952, Serial No. 279,859

Claims priority, application Great Britain April 14, 1951

5 Claims. (Cl. 267—63)

This invention relates to resilient suspension springs, particularly resilient suspension springs for road and rail vehicles.

In the case of a vehicle where the ratio of laden to unladen weight is high, a suspension spring of constant spring rate is undesirable since if the spring rate is low enough to provide smooth cushioning for the unladen vehicle it will not be sufficiently stiff to support satisfactorily the desired maximum load. Conversely a spring stiff enough for the heaviest load will be too stiff to provide good cushioning of the unladen vehicle. In this connection, the advantages of an increasing spring rate have long been recognised.

It is an object of the present invention to provide a resilient suspension spring in which the spring rate is increased considerably after a predetermined displacement of the supported load, whereby the suspension spring has a low spring rate for good cushioning of comparatively light loads and assumes a much higher spring rate when the load increases to a predetermined value.

According to the invention a resilient suspension spring comprises relatively movable loading members adapted to be connected to elements subject to relative displacement, a plurality of resilient members located between the loading members and adapted to be compressed in series by relative displacement of the loading members in one direction up to a predetermined value, and means whereby relative displacement of the loading members in said direction beyond said predetermined value causes compression of the resilient members in parallel.

The suspension spring may comprise means whereby the recoil displacement, i. e. relative displacement of the loading members in the opposite direction to that referred to in the preceding paragraph, is adapted to cause compression of a single resilient member or of a plurality of resilient members in parallel or of a plurality of resilient members in series. Alternatively means may be provided whereby recoil displacement up to a predetermined value is adapted to cause compression of a plurality of resilient members in series, and for further recoil displacement after said predetermined value, the resilient members are subject to compression in parallel.

In a preferred construction according to the invention a resilient suspension spring comprises a housing, a shaft extending into the housing through one end thereof and movable longitudinally relative to the housing, a rubber sleeve located on the shaft between a floating washer abutting an inner face of the end of the housing through which the shaft passes and a plate floating on the shaft, an abutment on the inside of the housing engaging the side of the plate remote from said sleeve, an abutment on the shaft spaced apart from said plate on the side remote from the sleeve and a second rubber sleeve located on the shaft between a second floating plate engaging with the side of the shaft abutment remote from the first rubber sleeve and a flange movable with the shaft, the second floating plate being adapted to engage with the housing abutment on outward movement of the shaft.

Figure 2:
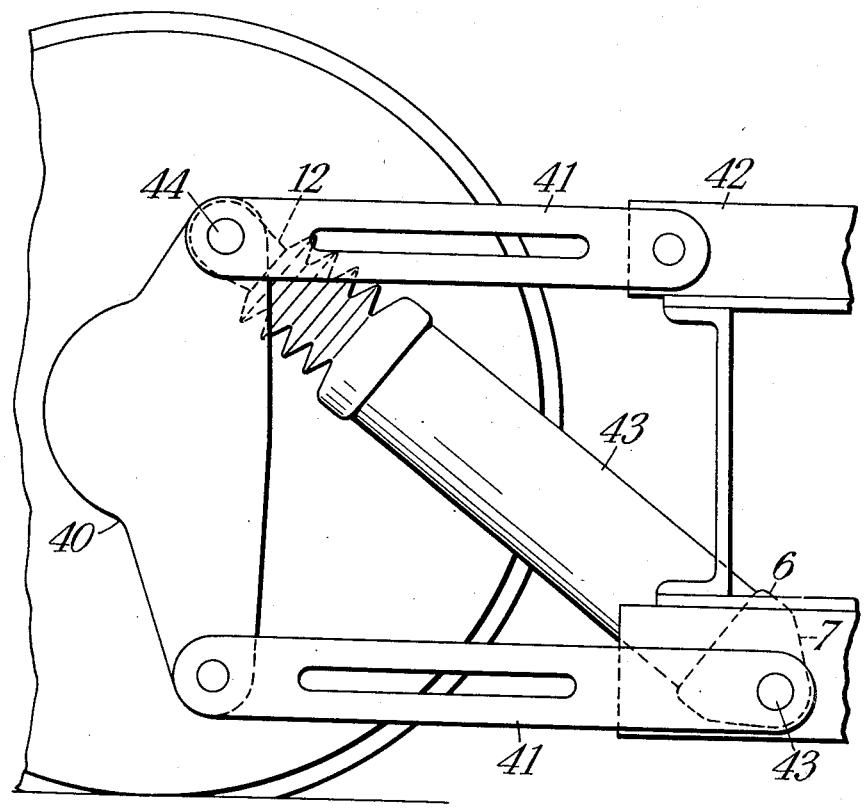

The invention will now be more particularly described with reference to the accompanying drawings wherein:

Figure 1 shows in part cross-section a resilient suspension spring according to the invention and Figure 2 shows diagrammatically a spring applied to the suspension of a railway carriage bogey.

The suspension spring (Fig. 1) comprises a housing I in the form of an outer tubular member formed of a major length 2 and a minor length 3 of tubing joined coaxially together by an externally threaded ring 4 engaging internal screwthreads in adjacent ends of the lengths. The major length is of the same internal and external diameters as the minor length, and adjacent ends of the lengths abut against each other when connected by the ring to form the outer tubular member. An annular housing abutment 5 is located in the interior of the tubular member between the ends of the major length thereof. The remote ends of the major and minor lengths are externally screw-threaded and the end of the minor length is closed by a metal cap 6 screwed thereon. The cap has an anchor plate 7 on the side remote from the tubular member and a hole is formed through the anchor for attaching the tubular member to a suspension point.

A cupped end plate 8 is screwed onto the end of the tubular member remote from the cap, and has a central, circular hole 9 therethrough coaxial with the axis of the tubular member when the end plate is fitted in position.

Within the tubular member and coaxial therewith a shaft 10 extends from adjacent the inner face of the cap to project through the hole in the cupped end plate. The projecting end 11 is screw threaded to engage a tapped hole in a forged steel shackle nut 12 adapted for attachment to a suspension point. An extensible rubber cover 28 is provided between the shackle 12 and the plate 8. The shaft is formed with three coaxial portions stepped in diameter with a portion 13 of maximum diameter at one end, an adjacent portion 14 of intermediate diameter and a portion 15 of minimum diameter at the other end. The end of the portion of maximum diameter is the end of the shaft on which the shackle nut 12 is fitted. The shoulder between the shaft portions of minimum and intermediate diameters lies between the ring 4 and the metal cap 6, being nearer the former than the latter, while the shoulder between the shaft portions of intermediate and maximum diameters lies approximately midway between the ring 4 and the cupped end plate 8. A short length at the end of each shaft portion remote from the shackle nut is screw-threaded. An annular end plate 16, having a tapped bore and an external diameter less than the internal diameter of the tubular member, is screwed on to the end of the shaft portion of minimum diameter at the end remote from the shackle nut.

An annular flange 17, having an external diameter less than the internal diameter of the ring 4 and a tapped bore, is screwed on to the screwed end of the shaft portion of intermediate diameter, and an internally screw-threaded metal bush 18 is screwed on to the end of the shaft portion of maximum diameter.

The screw-thread on the shaft 11 which engages the shackle nut is extended along the shaft to carry lock-nuts 19—19 adapted to pass through the hole 9 in the cupped end plate 8. The nuts are locked against each other to form a fixed stop and the nut remote from the shackle nut abuts against a washer 20 slidable on the shaft portion of maximum diameter and too large to pass through the hole 9 in the cup end plate 8.

A rubber sleeve 21 of annular cross-section is fitted on the shaft portion 13 of maximum diameter and is slightly compressed between the washer 20 and a floating annular plate 22 axially slidable on the said shaft portion and having an external diameter smaller than the internal diameter of the tubular member but larger than the internal diameter of the annular abutment 5 against which it is pressed. The floating plate has an internal diameter smaller than the external diameter of the metal bush 18 at the end of the shaft portion of major diameter. A second floating plate 23, similar to the first, is slidably disposed on the shaft portion of intermediate diameter, abutting the metal bush 18 and spaced apart from the annular abutment. The opposing faces of the two floating plates are each provided with a coaxial annular ridge of rubber 24 bonded to the plate. The ridges 24 extend axially and abut opposite ends of an annular metal spacer 29 around the metal bush, the axial length of which is less than the distance separating the adjacent faces of the plates.

A second rubber sleeve 25, similar to the first is disposed on the shaft portion 14 of intermediate diameter and is compressed between the second floating plate 23 and the annular flange 17.

A third rubber sleeve 26 of annular cross-section is disposed on the shaft portion 15 of minimum diameter and is compressed between the annular end plate 16 and a third floating plate 27 slidable on the said shaft portion and held between the rubber sleeve and the annular flange. A rubber annulus 31 is bonded to the flange 17 to prevent metallic contact with the plate 27. The outside diameter of the third floating plate is greater than the internal diameter of the ring joining the major and minor lengths of the outer tubular member and is spaced apart from said ring. The rubber sleeves are all of equal internal diameter and metal sleeves 30, 30 are interposed between the second and third rubber sleeves 25, 26 and the adjacent shaft portions 14, 15 to compensate for the reduced diameters of these portions.

It should be understood that in the foregoing description the disposition of the relatively movable components has been described in relation to an unloaded suspension spring, i. e. a spring which is free from external forces tending to cause relative movement between the shaft and the tubular member. In such a spring, the axial distance between the annular housing abutment 5 and the second floating plate 23 may be approximately one third of the axial distance between the coupling ring 4 and the third floating plate 27. However it should be understood that the relative position of the abutments and plates will depend upon the spring characteristics required.

The operation of the suspension spring under increasing tensile load will now be described.

The suspension spring is attached to elements subject to relative displacement by a pin passing through the hole in the shackle nut 12 at one end and a pin passing through the hole in the anchor 7 of the metal cap 6 at the other end. The attachment is such that relative movement of the elements due to principal or shock loading is adapted to extend the suspension spring by tending to withdraw the shaft 10 from the tubular member 1. As such extension of the spring takes place it is opposed by the resistance to compression of the two rubber sleeves 21, 25 nearer the cupped end plate on the tubular member. As the shaft 10 moves out of the tubular member 1 it carries with it the annular flange 17 at the screwed end of the shaft portion 14 of intermediate diameter; the flange 17 presses against the abutting rubber sleeve 25 and transmits force in an axial direction through said sleeve, through the first and second floating plates 22, 23 by way of the complementary ridges 24 thereon and the spacer 29 through the rubber sleeve 21 abutting against the washer 20 and through the washer 20 interposed between the last-mentioned rubber sleeve 21 and the cupped end plate 8, the force being resisted by reaction of the said end plate 8.

The washer 20 cannot move relative to the tubular member in those circumstances since it abuts the cupped end plate, and the annular flange 17 thus approaches the cupped end plate 8, thereby compressing the two said rubber sleeves 21, 25 in series.

After a predetermined extension of the suspension spring the floating plate 23 on the shaft portion 14 of intermediate diameter abuts the annular housing abutment 5 and is prevented from further movement in the direction of the cupped end plate. Simultaneously the metal bush 18 on the shaft portion 13 of maximum diameter abuts the floating plate 22 adjacent the cupped end plate. Further loading of the suspension spring now results in the two rubber sleeves 21, 25 adjacent the cupped end plate being subjected to compression in parallel and not in series as they were before the said predetermined extension of the spring was reached.

The changeover from series to parallel loading of the two said rubber sleeves results in a sharp increase in the spring rate of the suspension spring in tension, the stiffness before and after the changeover being in the ratio of approximately 1:4 since the rubber sleeves are of substantially the same dimensions.

The extension under load of the spring as thus far described is in no way effected by the rubber sleeve 26 adjacent the end of the tubular member closed by the metal cap. This sleeve merely moves with the shaft and maintains its original dimensions between the annular end plate 16 and the adjacent floating plate 27. Further loading of the suspension spring, however, brings the said floating plate 27 towards the ring connection 4 between the major and minor lengths 2, 3 of the tubular member; the annular flange 17 on the shaft portion of intermediate diameter is small enough to pass through the ring, but after a further predetermined extension of the suspension unit the floating plate 27 abuts the ring 4 and can move no further with the shaft. The annular end plate 16 continues to advance with the shaft and the axial distance between the annular end plate and adjacent floating plate decreases as the suspension unit is extended and the rubber sleeve 26 abutting the end plate is subjected to compression. During this third stage in the loading of the suspension spring, therefore, all three rubber sleeves are compressed in parallel and a further sharp increase in the spring rate of the spring takes place as the third sleeve comes into resistive operation.

Briefly then, the three stages of loading the suspension spring are as follows:

1. Two rubber sleeves being compressed in series,
2. The same two rubber sleeves being compressed in parallel,
3. All three rubber sleeves being compressed in parallel.

When the shaft is moved in the opposite direction relatively to the tubular member, usually under the recoil force after shock has been terminated, the contraction of the suspension spring is opposed only by the resistance to compression of the rubber sleeve 21 adjacent the cupped cover plate. Recoil load is transmitted from the shackle nut 12 to the shaft 10 and thence through the lock nuts 19 and the washer 20 to the abutting rubber sleeve 21, the sleeve being prevented from bodily movement relative to the tubular member by the floating plate 22 at the end of the sleeve remote from the washer abutting against the annular abutment 5. The two other rubber sleeves do not come into resistive operation on the recoil stroke as they move bodily with the shaft.

In one application of the invention (Fig. 2), the suspension spring described herein is used to provide a resilient suspension system for a railway carriage bogey wheel. The wheel mounting 40 is carried, trailing fashion on pivotal connections to two normally horizontal, spaced apart arms 41 pivoted on the bogey frame 42. The suspension spring 43 is pivoted by the hole in the anchor 7 of the cap 6 at one end of the suspension spring on the pivot 43 of the lower arm, and the shackle nut 12 is pivoted on the pivotal connection 44 of the upper arm to the wheel mounting. When the wheel is raised with respect to the bogey, the suspension spring is extended and when the wheel moves down the spring is contracted.

It will be appreciated that the number and disposition of resilient members may be varied widely from the particular example described herein. A minimum of two resilient members is required but any greater number may be employed, and although coaxial arrangement of the resilient members is often convenient, the invention is not limited to such an arrangement since the resilient members may be disposed in side-by-side or other relationship. Whatever the arrangement of the component parts of the suspension spring, it is essential to the invention that a plurality of resilient members combine to oppose deflecting forces by resistance to compression in series up to a predetermined deflection, after which point some or all of the resilient members resist further deflection in parallel, whereby a substantial increase in the stiffness of the suspension takes place at the changeover from series to parallel loading.

A suspension spring according to the present invention may be advantageously employed wherever the suspension is called upon to accommodate a wide range of loading; it is particularly useful as a rail or road vehicle suspension spring or for use in draw-gear for trailers.

The invention is not restricted to the particular construction described above. For instance the tubular housing may be in one piece with an annular abutment welded therein in place of the nipple described. The split housing however enables the spring to be assembled more easily. Furthermore, the metal spacer between the rubber ridges on the first and second floating plates may be omitted if the dimensions of a particular spring require.

Having described my invention, what I claim is:

1. A resilient suspension spring comprising a housing adapted to be connected to one of a pair of elements subject to relative displacement, a shaft to be connected to the other element extending into the housing through one end thereof and movable longitudinally relative to the housing, a stop on the shaft, a floating washer engaging with the inner faces of the stop and of the adjacent end of the housing, a first plate floating on the shaft, a resilient member carried by the shaft and located between said first plate and the washer, an abutment on the inside of the housing engaging the side of the first plate remote from the resilient member, an abutment on the shaft spaced apart from the first plate on the side remote from the resilient member, a second floating plate engaging with the shaft abutment on the side remote from the first plate and engageable with the housing abutment on outward movement of the shaft, a spacer separating the first and second floating plates, a flange movable with the shaft, and a second resilient member located between the second floating plate and the flange.

2. A resilient suspension spring according to claim 1 comprising an annular end plate on the shaft, a third floating plate on the shaft engaging the side of the flange remote from the second resilient member, a second abutment on the inside of the housing and a third resilient member located on the shaft between the third floating plate and said annular end plate, the third floating plate being engageable with the second abutment on outward movement of the shaft.

3. A resilient suspension spring according to claim 2 wherein the shaft comprises three coaxial portions stepped in diameter with the portion of maximum diameter at the end thereof exterior of the housing and extending to the shaft abutment, the portion of intermediate diameter extending therefrom to the flange and the portion of least diameter extending from the flange to the end of the shaft carrying the annular end plate.

4. A resilient suspension spring according to claim 3 wherein the housing comprises two coaxial abutting portions of equal diameter and a ring connecting said portions and forming the second housing abutment.

5. A resilient suspension spring according to claim 4 wherein the end of the shaft exterior of the housing is provided with a shackle to be connected to one element and the end of the housing remote therefrom is closed by a cap having an anchor to be connected to the other element.

ROBERT MAXWELL SEDDON.

References Cited in the file of this patent

UNITED STATES PATENTS

| Number | Name | Date |
| --- | --- | --- |
| 2,402,400 | Hewitt et al. | June 18, 1946 |
| 2,574,420 | Seddon | Nov. 6, 1951 |